United States Patent
McAlexander (10) Patent No.: US 7,340,260 B2
(45) Date of Patent: Mar. 4, 2008

(54) SYSTEM AND METHOD FOR TRACKING THE LOCATION OF MULTIPLE MOBILE RADIO TRANSCEIVER UNITS

(75) Inventor: Joseph C. McAlexander, Murphy, TX (US)

(73) Assignee: MDF Holdings, Inc., Murphy, TX (US)

( * ) Notice: Subject to any disclaimer, the term of this patent is extended or adjusted under 35 U.S.C. 154(b) by 0 days.

(21) Appl. No.: 10/683,571

(22) Filed: Oct. 9, 2003

(65) Prior Publication Data

US 2005/0054351 A1 Mar. 10, 2005

Related U.S. Application Data (60) Provisional application No. 60/417,265, filed on Oct. 9, 2002.

(51) Int. Cl.
*H04Q 7/20* (2006.01)

(52) U.S. Cl. .................. 455/456.1; 455/423; 455/424; 455/457; 455/463; 701/207; 701/213

(58) Field of Classification Search ............ 455/456.1, 455/423, 457, 463; 701/200; 201/202, 213

See application file for complete search history.

(56) References Cited

U.S. PATENT DOCUMENTS

| 5,875,398 | A | 2/1999 | Snapp |
| 6,510,380 | B1 * | 1/2003 | Curatolo et al. ............. 701/207 |
| 6,618,593 | B1 * | 9/2003 | Drutman et al. ......... 455/456.3 |
| 2002/0169539 | A1 * | 11/2002 | Menard et al. ............. 701/200 |
| 2003/0030561 | A1 * | 2/2003 | Yafuso et al. ............. 340/573.4 |
| 2003/0233189 | A1 * | 12/2003 | Hsiao et al. ................. 701/207 |
| 2004/0054471 | A1 * | 3/2004 | Bartlett et al. .............. 701/213 |
| 2005/0272441 | A1 * | 12/2005 | Bates et al. .............. 455/456.1 |

* cited by examiner

*Primary Examiner*—David Q Nguyen (57) ABSTRACT

An object locating system (100), the system (100) comprising at least first and second mobile devices (120, 130) associated by a relationship defined at least in part by a threshold. The at least first and second mobile devices are operable to be monitored by a communication network as one mobile device (120) or as separate mobile devices (120, 130) as a function of the relationship relative to the threshold.

21 Claims, 4 Drawing Sheets

SYSTEM AND METHOD FOR TRACKING THE LOCATION OF MULTIPLE MOBILE RADIO TRANSCEIVER UNITS

CROSS-REFERENCE TO RELATED APPLICATION

This application claims priority under 35 USC 119(e) to U.S. provisional Application Ser. No. 60/417,265, filed on Oct. 9, 2002, and which is incorporated herein by reference.

TECHNICAL FIELD OF THE INVENTION

The present invention is directed, in general, to location tracking systems and, more specifically, to a system for tracking the locations of multiple mobile units that communicate with a central monitoring device by a radio frequency (RF) link.

BACKGROUND OF THE INVENTION

Tracking the location or position of a body that can move in unknown directions over a considerable range of territory has been a concern for a number of years. The term "body" is defined broadly, meaning any organic or inorganic object whose movement or position may suitably be evaluated relative to its environment in accordance with the principles hereof. The term "environment" is defined broadly as conditions and influences that define, at least in part, the physical system in which the body is located.

In the past, locating systems were proposed that employed conventional wireless technology, but which tended to be cumbersome, bulky, expensive, and lack robustness, or all of the above. With the deployment of the global positioning system (GPS), it is now possible to provide relatively inexpensive location systems for determining body location. Such systems have been utilized, for example, on trucks to provide location information for companies having large fleets of trucks in use at any one particular time. The position of each individual truck may therefore be tracked.

Conventional GPS devices have disadvantages, including relative slowness in acquiring location data, being strongly dependent upon the target body being in an open area where it is in a line-of-sight position to the GPS satellites, and consuming a relatively large amount of electrical power during the period in which the location information is being acquired from the GPS satellites.

The inventor hereof disclosed various methodologies for an improved object locator system in the following United States Patents:

1) U.S. Pat. No. 6,518,919, entitled "Mobile Object Locator";
2) U.S. Pat. No. 6,480,147, entitled "Portable Position Determining Device";
3) U.S. Pat. No. 6,441,778, entitled "Pet Locator";
4) U.S. Pat. No. 6,421,001, entitled "Object Locator";
5) U.S. Pat. No. 6,236,358, entitled "Mobile Object Locator" and
6) U.S. Pat. No. 6,172,640, entitled "Pet Locator".

These patents disclose an object locator system that requests and obtains information about the location of a mobile object, having attached thereon a lightweight object locator that is operable in a region served by a two-way paging system and a global positioning system. The object locator may be activated selectively to conserve power or enabled to respond only when beyond or within a defined boundary. These patents also teach that the object locator system provides the location information in several forms.

However, the methodologies disclosed in these patents fail to include the robustness necessary to track groups of bodies/objects that are related, permanently or temporarily, within one or more environments. Further, these methodologies fail to understand the complex relationships between related bodies/objects, whether such relationships are hierarchical or otherwise. Further yet, these methodologies fail to adequately address continued (though reduced) line-of-sight and power management issues.

Therefore, there is a need in the art for an improved system for gathering the location information of one or more tracked objects.

SUMMARY OF THE INVENTION

To address the above-discussed deficiencies of the prior art, it is a primary object of the present invention to provide a object locating system, the system comprising at least first and second mobile devices associated by a relationship defined at least in part by a threshold, wherein the at least first and second mobile devices are operable to be monitored by a communication network as one mobile device or as separate mobile devices as a function of the relationship relative to the threshold.

In one embodiment of the present invention, the threshold is based upon distance between the at least first and second mobile devices.

In another embodiment of the present invention, the relationship between the at least first and second mobile devices is hierarchical.

In still another embodiment of the present invention, the hierarchical relationship is master-slave between the at least first and second mobile devices.

In yet another embodiment of the present invention, the relationship is dynamic.

In a further embodiment of the present invention, the relationship is static.

In a still further embodiment of the present invention, the communications network uses passive tags to monitor mobile devices.

In one embodiment of the present invention, the communications network is capable of tracking monitored mobile devices relative to an environment, such as a position within a geographical boundary.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless communication network.

Figure 1:
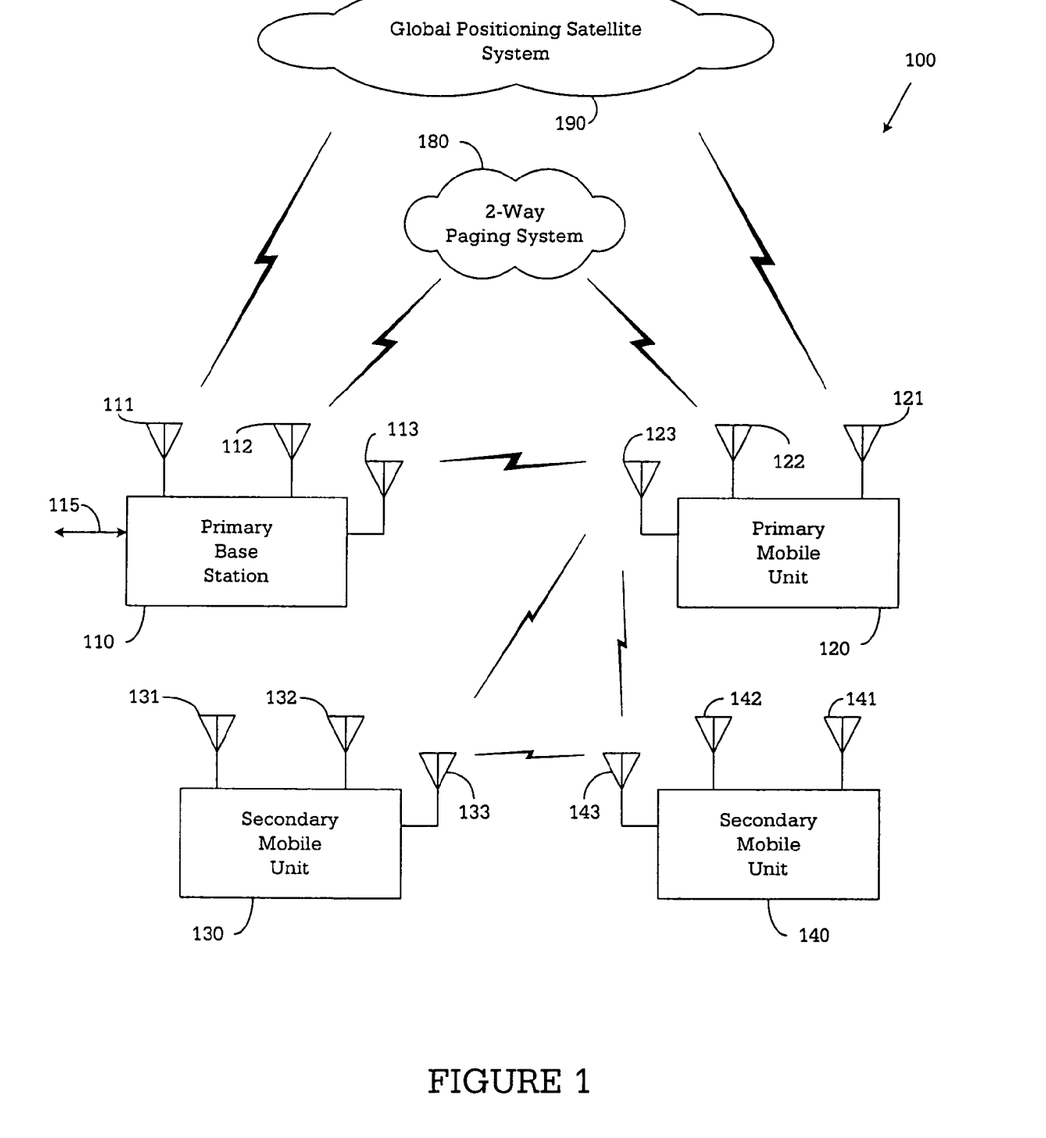
FIG. 1 illustrates a location tracking system according to an advantageous embodiment of the present invention.

FIG. 1 illustrates location tracking system 100 according to an advantageous embodiment of the present invention. Location tracking system 100 comprises primary base station 110, primary mobile unit 120, and up to "N" secondary mobile units, including exemplary secondary mobile units 130 and 140, associated with primary mobile unit 120. Each one of primary mobile unit 120 and the N secondary mobile units is attached to a person, animal, vehicle or other mobile object that is being tracked. Location tracking system 100 may comprise additional primary base stations similar to primary base station 110 and additional primary mobile units similar to primary mobile unit 120. However, to avoid redundancy and to simplify the explanation of the present invention, only primary base station 110 and primary mobile unit 120 are shown.

Location tracking system 100 is an improvement on the mobile object locating system and related components thereof that are disclosed in numerous United States patents to Durst et al., including U.S. Pat. No. 6,172,640, U.S. Pat. No. 6,236,358, U.S. Pat. No. 6,421,001, U.S. Pat. No. 6,441,778, U.S. Pat. No. 6,480,147 and U.S. Pat. No. 6,518,919. The subject matter disclosed in each of U.S. Pat. No. 6,172,640, U.S. Pat. No. 6,236,358, U.S. Pat. No. 6,421,001, U.S. Pat. No. 6,441,778, U.S. Pat. No. 6,480,147 and U.S. Pat. No. 6,518,919 (collectively referred to hereafter as "the Durst patents") is hereby incorporated into the present disclosure as if fully set forth herein.

Primary base station 110 comprises antennas 111, 112 and 113. According to an exemplary embodiment of the present invention, primary base station 110 comprises a Global Positioning System (GPS) receiver that determines the position of primary base station 110 using radio frequency signals received from global positioning satellite system 190 via antenna 111. Primary base station 110 also comprises a 2-way paging transceiver that communicates with one or more of primary mobile unit 120 and the N secondary mobile units (e.g., units 130 and 140). The paging transceiver communicates bi-directionally with 2-way paging system 180 via antenna 112. Finally, primary base station 110 comprises a local RF transceiver that communicates directly with one or more of primary mobile unit 120 and the N secondary mobile units over relatively short distances using antenna 113.

Additionally, primary base station 110 is capable of communicating over line 115 via a wireline interface with an external communication network (not shown), such as the Internet or an Ethernet local area network (LAN). This allows primary base station 110 to exchange location information with other primary base stations.

Primary mobile unit 120 comprises antennas 121, 122 and 123. According to an exemplary embodiment of the present invention, primary mobile unit 120 comprises a Global Positioning System (GPS) receiver that determines the position of primary mobile unit 120 using radio frequency signals received from global positioning satellite system 190 via antenna 121. Primary mobile unit 120 also comprises a 2-way paging transceiver that communicates with primary base station 110 and the N secondary mobile units (e.g., units 130 and 140). The paging transceiver communicates bi-directionally with 2-way paging system 180 via antenna 122. Finally, primary mobile unit 120 comprises a local RF transceiver that communicates directly with one or more of primary base station 110 and the N secondary mobile units over relatively short distances using antenna 123.

Secondary mobile unit 130 comprises antennas 131, 132 and 133. According to an exemplary embodiment of the present invention, secondary mobile unit 130 comprises a Global Positioning System (GPS) receiver that determines the position of secondary mobile unit 130 using radio frequency signals received from global positioning satellite system 190 via antenna 131. Secondary mobile unit 130 also comprises a 2-way paging transceiver that communicates with primary base station 110, primary mobile unit 120, and the remaining N-1 secondary mobile units (e.g., unit 140). The paging transceiver communicates bi-directionally with 2-way paging system 180 via antenna 132. Finally, secondary mobile unit 130 comprises a local RF transceiver that communicates directly with one or more of primary base station 110, primary mobile unit 120, and the remaining N secondary mobile units over relatively short distances using antenna 133.

Secondary mobile unit 140 is identical in nearly all respect to secondary mobile unit 130. Secondary mobile unit 140 comprises antennas 141, 142 and 143. Secondary mobile unit 140 comprises a Global Positioning System (GPS) receiver that determines the position of secondary mobile unit 140 using radio frequency signals received from global positioning satellite system 190 via antenna 141. Secondary mobile unit 140 also comprises a 2-way paging transceiver that communicates with primary base station 110, primary mobile unit 120, and the remaining N-1 secondary mobile units (e.g., unit 130). The paging transceiver communicates bi-directionally with 2-way paging system 180 via antenna 142. Finally, secondary mobile unit 140 comprises a local RF transceiver that communicates directly with one or more of primary base station 110, primary mobile unit 120, and the remaining N secondary mobile units over relatively short distances using antenna 143.

Figure 2:
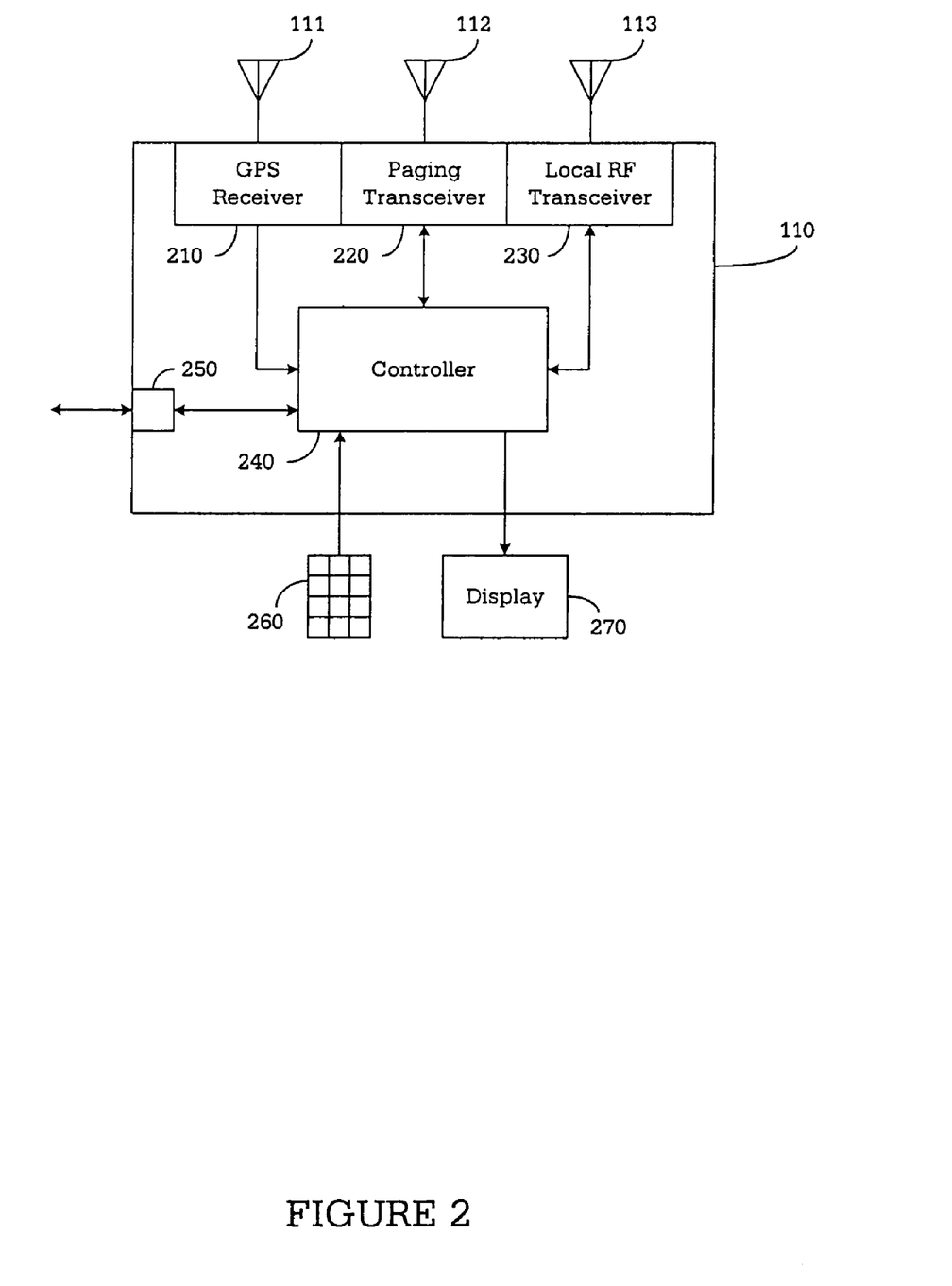
FIG. 2 illustrates a primary base station in greater detail according to an exemplary embodiment of the present invention.

FIG. 2 illustrates primary base station 110 in greater detail according to an exemplary embodiment of the present invention. It should be noted that primary mobile unit 120 and secondary mobile units 130 and 140 are identical in most respects to primary base station 110. Therefore, the following description of primary base station 110 also applies to primary mobile unit 120 and secondary mobile units 130 and 140, except as noted otherwise.

Primary base station 110 comprises GPS receiver 210, paging transceiver 220 and local radio frequency (RF) transceiver 230. GPS receiver 210, paging transceiver 220 and local RF transceiver 230 communicate via antennas 111, 112 and 113, respectively, as described above in FIG. 1. Primary base station 110 also comprises controller 240, input/output (I/O) interface 250, user input device 260 (e.g., keyboard), and display 270 (e.g., digital alphanumeric readout, LCD display, flat panel video monitor, or the like).

Controller 240 controls the overall operation of primary base station 110, including the operation of GPS receiver 210, paging transceiver 220 and local RF transceiver 230. According to an exemplary embodiment, controller 240 may comprise a data processor and an associated memory, wherein the data processor executes an operating system program stored in the memory. Controller 240 uses I/O interface 250 to communicate with external systems across wireline 115. These external systems may include other primary base stations. Controller 240 also receives user commands and data via user input device 260 and outputs data, alerts, instructions and the like to the user via display 270.

Primary base station 110 monitors the locations of one of more primary mobile units and one or more secondary mobile units that are attached to, or carried by, for example, a group of persons, a group of animals, a group of vehicles, and the like. According to the principles of the present invention, primary base station 110 may communicate directly only with primary mobile units, using either paging transceiver 220 or local RF transceiver 230. In this scenario, primary base station 110 communicates with secondary mobile units indirectly using primary mobile unit 120. In this manner, location information is relayed from secondary mobile units 130 and 140 to primary base station 110 through primary mobile unit 120. According to the principles of the present invention, secondary mobile stations 130 and 140 may communicate with each other and with primary mobile unit 120 using either paging transceiver 220 or local RF transceiver 230. Preferably, local RF transceiver 230 is used to relay location information, thereby limiting the usage of 2-way paging system 180.

Advantageously, relaying position information through primary mobile unit 120 limits the number of mobile units with which primary base station 110 must communicate directly. This reduces the overhead messaging and bandwidth usage through 2-way paging system 180 and/or through local RF transceiver 230.

It is not required that primary base station 110, primary mobile unit 120, and secondary mobile units 130 and 140 contain three separate receiver or transceivers. Some state of the art RF transceivers are capable of operating (sometimes simultaneously) in a wide range of frequency bands using a number of different modulation techniques and protocols. Thus, for example, paging transceiver 220 and local RF transceiver 230 may actually be a single transceiver that communicates directly (i.e., transceiver to transceiver) with other mobile units or primary base stations or communicates with other mobile units or primary base stations via 2-way paging system 180.

According to an advantageous embodiment of the present invention, local RF transceiver 230 is a relatively short-range device that communicates over ranges of, for example, 500 yards or less. For example, local RF transceiver 230 may be an 802.11 transceiver that communicates with another local RF transceiver 230 according to a wireless Ethernet protocol. Alternatively, local RF transceiver 230 may communicate over short distances with another local RF transceiver 230 according to a Bluetooth protocol. However, when a mobile unit is out of range of primary base station 110 or other mobile units, the mobile unit uses paging transceiver 220 to communicate bi-directionally with primary base station 110 or other mobile units.

It should be noted that primary base station 110 is not required to be stationary and may, in fact, be a mobile device. The term "primary base station" is intended to designate primary base station 110 as a central monitoring device to which mobile unit location information is transmitted, either directly or by relay. This is true whether primary base station 110 is located at a fixed geographical position or is on the move.

Also, it should be noted that a mobile unit may be switched between being a primary mobile unit or a secondary mobile unit. A mobile unit is a primary mobile unit if it communicates with primary base station 110. A mobile unit is a secondary mobile unit if it communicates only with another mobile unit (primary or secondary) that, in turn, relays location information to primary base station 110.

It may be helpful at this point to provide examples of the operation of base stations and mobile units in location tracking system 100. In a first example, a tour group at a large amusement park uses base stations and mobile units to monitor members of the tour group. The tour guide is equipped with primary base station 110. A first parent chaperone is equipped with a first primary mobile unit 120A and a second parent chaperone is equipped with a second primary mobile unit 120B. Each student in the tour group is equipped with a secondary mobile unit 130.

If the tour group stays together, the secondary mobile unit used by each student transmits position location information to either first primary mobile unit 120A or second primary mobile unit 120B. For example, the mobile units used by all female students may communicate with first primary mobile unit 120A used by the first parent chaperone and the mobile units used by all male students may communicate with second primary mobile unit 120B used by the second parent chaperone. The mobile units may be assigned in this manner by manual inputs on user input device 260. Since all group members are in close proximity, the communications between the primary mobile units and secondary mobile units generally will be conducted by local RF transceiver 230.

The student position information is relayed by first primary mobile unit 120A and second primary mobile unit 120B to primary base station 110. Since all group members are in close proximity, the communications between the primary mobile units and primary base station 110 generally will be conducted by local RF transceiver 230. However, in some embodiments, paging transceiver 220 may be used by default. If the students and chaperones move away from the tour guide, then paging transceiver 220 must be used.

At this point, the second parent chaperone and the male students may break away from the first parent chaperone and the female students. Nonetheless, the position information of all male students and the second parent chaperone continues to be transmitted by the second primary mobile unit 120B to primary base station 110.

According to an advantageous embodiment of the present invention, second primary mobile unit 120B used by the second parent chaperone may originally operate as a secondary mobile unit. Thus, the position information of all students and the second chaperone is transmitted to the first primary mobile unit 120A for subsequent relay to primary base station 110. In this situation, the secondary mobile unit used by the second parent chaperone may or may not receive and relay location information from the secondary mobile units used by the male students.

However, at some point, when the second parent chaperone moves away from the first parent chaperone, the secondary mobile unit used by the second parent chaperone will lose contact with the first primary mobile unit 120A used by the first parent chaperone. When this occurs, the secondary mobile unit used by the second parent chaperone will switch from secondary mode to primary mode and become primary mobile unit 120B. After the mode switch, primary mobile unit 120B used by the second parent chaperone will establish a new connection to primary base station 110 via 2-way paging system 180 and will begin to relay its own position information and the position information of nearby male students to primary base station 110.

According to an advantageous embodiment of the present invention, each secondary mobile unit (e.g., units 130 or 140) is capable of searching for an alternate primary mobile unit 120 if the secondary mobile unit loses contact with its assigned primary mobile unit 120. Thus, for example, if the second parent chaperone and most of the male students move away from the first parent chaperone, but one male student remains with the first parent chaperone and the female students, secondary mobile unit 130 used by the separated male student will eventually lose contact with the second primary mobile unit 120B used by the second parent chaperone. When this happens, secondary mobile unit 130 will search for and acquire the first primary mobile unit 120A used by the first parent chaperone. At this point, the first primary mobile unit 120A will relay the location information of the separated male student to primary base station 110.

It should also be noted that the components of location tracking system 100 are not exclusively dependent on global positioning satellite system 190. According to an advantageous embodiment of the present invention, location tracking system 100 is preferably a GPS-assisted system that is capable of determining the location information of mobile units using alternative devices, both active and passive. This is particularly advantageous because GPS receivers are line-of-sight devices and often do not operate indoors.

Figure 3:
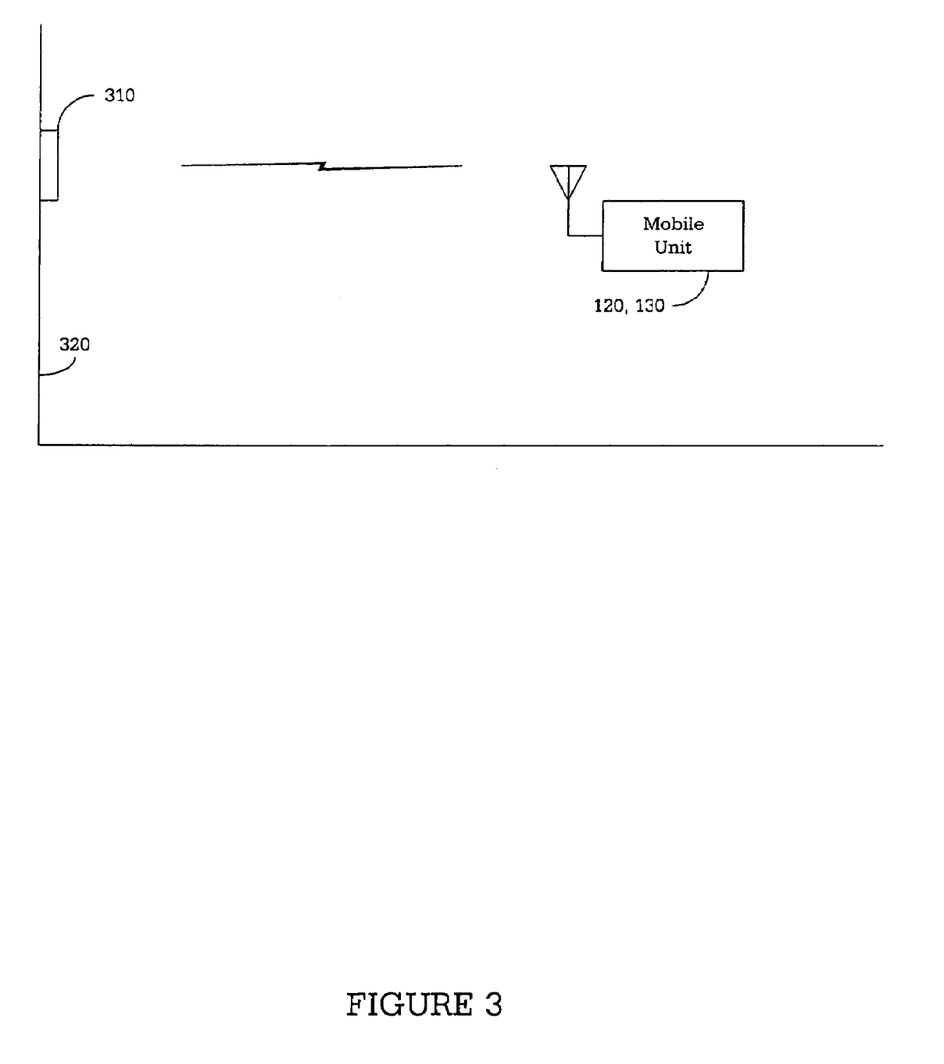
FIG. 3 illustrates an alternate method of determining the location of a mobile unit according to one embodiment of the present invention.

FIG. 3 illustrates an alternate method of determining the location of a mobile unit according to one embodiment of the present invention. In the illustrated embodiment, a mobile unit (e.g., primary mobile unit 120 or secondary mobile unit 130) obtains location information from transponder 310 attached to wall 320 of a building. Transponder 310 may be either an active or a passive radio frequency (RF) identification (ID) tag, similar to the toll tags commonly used on automobiles. When mobile unit 120 (or 130) loses the GPS signals from global positioning satellite system 190, local RF transceiver 230 changes mode and automatically begins to transmit RF ID signals to transponder 310. If mobile unit 120 (130) is sufficiently close to transponder 310, transponder 310 transmits back to mobile unit 120 (130) the ID information (i.e., location information) embedded in transponder 310.

According to an exemplary embodiment of the present invention, the ID information in transponder 310 comprises highly precise latitude, longitude, and elevation information, similar to GPS data. Thus, even though mobile unit 120 (or 130) is indoors, mobile unit 120 (or 130) can still determine its location information. The location information received from transponder 310 is then transmitted (directly or by relay) to primary base station 110.

The widespread use of transponders in a building is particularly useful for firefighters. A fire chief may dispatch several teams of firefighters into a building. Each team has a team leader who carries a primary mobile unit 120. The other members of each team carry secondary mobile units 130, 140. As the firefighters move through the building, each mobile unit captures its location information from each transponder 310 the mobile unit passes. Secondary mobile units 130 and 140 transmit location information to primary mobile unit 120 carried by the team leader. Primary mobile unit 120 then transmits its location information and the location information of the secondary mobile units to primary base station 110. Advantageously, if a team member using secondary mobile unit 130 is separated from the team leader and loses contact with primary mobile unit 120, secondary mobile unit 130 can switch modes to become a primary mobile unit and establish a new communication link to primary base station 110 via 2-way paging system 180.

Figure 4:
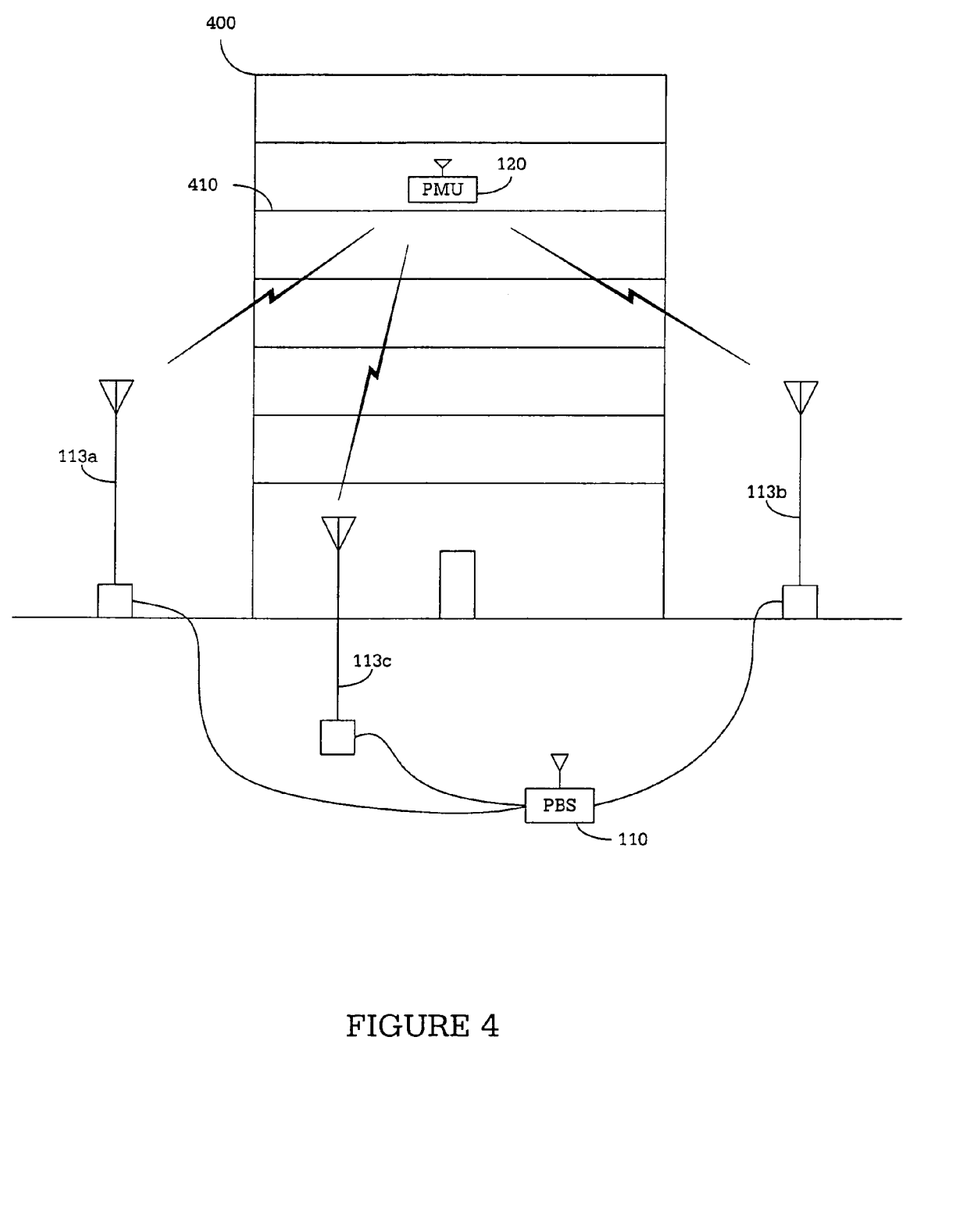
FIG. 4 illustrates another alternate method of determining the location of a mobile unit according to one embodiment of the present invention.

FIG. 4 illustrates another alternate method of determining the location of a mobile unit according to one embodiment of the present invention. According to the alternate embodiment, primary base station 110 may use conventional triangulation techniques to determine the location information of a mobile unit. As FIG. 4 illustrates, primary mobile unit 120 is located on an upper floor (labeled 410) inside building 400. Primary base station 110 controls a plurality of antennas, including antennas 113a, 113b and 113c. Each of antennas 113a, 113b and 113c is positioned at a known geographical location and elevation.

If transponders, such as transponder 310, are not present and GPS signals are blocked, local RF transceiver 220 in primary mobile unit 120 may transmit a beacon signal. The beacon signal is received by each of antennas 113a, 113b and 113c. Primary base station 110 uses beamforming or similar techniques on the received beacon signals to determine the direction in three-dimensional (3D) space of primary mobile unit 120. Conventional triangulation techniques may then be used to pinpoint the location of primary mobile unit 120.

It should be noted that the foregoing embodiments were introduced for illustrative purposes only and that the present invention broadly introduces systems, as well as methods of operating such systems, that define one or more relationships among mobile units monitored by at least one communications network containing a primary base station. Such relationships are defined by an environment, which in the above-given example is an tour group environment. An important aspect of the present invention is that the controller is operable to process sensed phenomena as a function of the environment, and that such phenomena will largely be defined by the specific application. Therefore, the system, and, more particularly, the controller, generates state indicia relative to the environment of interest, and determines whether the related mobile units are monitored as one or two (or more) mobile units in the context of that environment and as a function of one or more thresholds. For instance, "threshold" would likely be very different for monitored devices a group of elderly people on an outing, firemen responding to a fire in a high rise, a tour group in an amusement park, a television camera crew reporting at a natural disaster, a tactical military team, or the like. One threshold described above is the loss of signal contact between mobile units. In alternated embodiments, other thresholds may trigger the monitoring of the related mobile units as one or two (or more) mobile units. For example, if a secondary mobile unit wanders outside of a defined geographical area, the system may monitor the secondary mobile unit as a primary unit instead.

Although the present invention has been described with an exemplary embodiment, various changes and modifications may be suggested to one skilled in the art. It is intended that the present invention encompass such changes and modifications as fall within the scope of the appended claims.

What is claimed is:

1. A method, comprising:
    determining, at a first mobile device capable of operating within a tracking system, a position of the first mobile device;
    transmitting, from the first mobile device to a central monitoring system associated with the tracking system, first position information associated with the first mobile device;
    relaying, from the first mobile device to the central monitoring system, second position information associated with a second mobile device; and
    switching the first mobile device from being a primary mobile unit to a secondary mobile unit such that the first mobile device transmits the first position information to at least one of the second mobile device and a third mobile device for relaying to the central monitoring system, and wherein when the first mobile device is a secondary mobile unit the first mobile device communicates directly only with the at least one of the second mobile device and the third mobile device.

2. The method of claim 1, wherein the relaying of the second position information to the central monitoring system by the first mobile device occurs when the second mobile device is within a threshold distance of the first mobile device.

3. The method of claim 2, wherein the second mobile device is capable of transmitting the second position information directly to the central monitoring system when the second mobile device is not within the threshold distance of the first mobile device.

4. The method of claim 1, further comprising:
    transmitting, from the first mobile device to the central monitoring system, a beacon signal only when the first mobile device cannot determine its location.

5. A tracking system, comprising:
    a central monitoring system; and
    a first mobile device capable of:
        determining a position of the first mobile device;
        transmitting to the central monitoring system first position information associated with the first mobile device;
        relaying to the central monitoring system second position information associated with a second mobile device; and
        switching the first mobile device from being a primary mobile unit to a secondary mobile unit such that the first mobile device transmits the first position information to at least one of the second mobile device and a third mobile device for relaying to the central monitoring system, and wherein when the first mobile device is a secondary mobile unit the first mobile device communicates directly only with the at least one of the second mobile device and the third mobile device.

6. The tracking system of claim 5, wherein the first mobile device is capable of relaying the second position information to the central monitoring system when the second mobile device is within a threshold distance of the first mobile device.

7. The tracking system of claim 6, wherein the second mobile device is capable of transmitting the second position information directly to the central monitoring system when the second mobile device is not within the threshold distance of the first mobile device.

8. The tracking system of claim 6, wherein a value of the threshold distance is static.

9. The tracking system of claim 6, wherein a value of the threshold distance is dynamic.

10. The tracking system of claim 5, wherein at least one of the first and second mobile devices comprises a Global Positioning System (GPS) unit.

11. The tracking system of claim 5, wherein at least one of the first and second mobile devices comprises a transceiver capable of receiving signals from an RF transponder.

12. The tracking system of claim 5, wherein the central monitoring system is capable of monitoring one or more positions of at least one of the first and second mobile devices while the at least one of the first and second mobile devices is within a defined geographical boundary.

13. The tracking system of claim 5, wherein the central monitoring system comprises a first base station and a second base station each capable of receiving a beacon signal from the first mobile device.

14. The tracking system of claim 13, wherein the central monitoring system is capable of determining the position of the first mobile device using a triangulation algorithm that uses the beacon signal received from the first mobile device by the first base station and the second base station.

15. A mobile device, comprising:
    a position determining unit capable of determining a position of the first mobile device; and
    at least one transceiver capable of:
        transmitting, to a central monitoring system, first position information associated with the first mobile device;
        relaying to the central monitoring system second position information associated with a second mobile device; and
        after switching from a primary mobile unit to a secondary mobile unit, the first mobile device transmitting the first position information to at least one of the second mobile device and a third mobile device for relaying to the central monitoring system, and wherein when the first mobile device is a secondary mobile unit the first mobile device communicates directly only with the at least one of the second mobile device and the third mobile device.

16. The mobile device of claim 15, wherein the at least one transceiver is capable of relaying the second position information to the central monitoring system when the second mobile device is within a threshold distance of the first mobile device.

17. The mobile device of claim 16, wherein the second mobile device is capable of transmitting the second position information directly to the central monitoring system when the second mobile device is not within the threshold distance of the first mobile device.

18. The mobile device of claim 15, wherein the position determining unit comprises a Global Positioning System (GPS) unit.

19. The mobile device of claim 15, wherein the position determining unit comprises a transceiver capable of receiving signals from an RF transponder.

20. The mobile device of claim 19, wherein the at least one transceiver is capable of transmitting identification information associated with the RF transponder to the central monitoring system.

21. The mobile device of claim 15, wherein the at least one transceiver is capable of transmitting a beacon signal to a plurality of base stations associated with the central monitoring system.

* * * * *